(12) United States Patent
Sanchez

(10) Patent No.: US 11,668,580 B2
(45) Date of Patent: *Jun. 6, 2023

(54) SYSTEM AND METHOD OF CREATING CUSTOM DYNAMIC NEIGHBORHOODS FOR INDIVIDUAL DRIVERS

(71) Applicant: BlueOwl, LLC, San Francisco, CA (US)

(72) Inventor: Kenneth J. Sanchez, San Francisco, CA (US)

(73) Assignee: BLUEOWL, LLC, San Francisco, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 17/088,967

(22) Filed: Nov. 4, 2020

(65) Prior Publication Data

US 2021/0048309 A1   Feb. 18, 2021

Related U.S. Application Data

(63) Continuation of application No. 16/183,797, filed on Nov. 8, 2018, now Pat. No. 10,830,603.

(51) Int. Cl.
*G01C 21/36*  (2006.01)
*G01C 21/34*  (2006.01)
*H04W 4/024*  (2018.01)
*G06Q 40/08*  (2012.01)

(52) U.S. Cl.
CPC ..... *G01C 21/3667* (2013.01); *G01C 21/3484* (2013.01); *G01C 21/3697* (2013.01); *H04W 4/024* (2018.02); *G06Q 40/08* (2013.01)

(58) Field of Classification Search
CPC ............ G01C 21/3484; G01C 21/3667; G01C 21/3697; G01C 21/3856; G06Q 40/08; H04W 4/02; H04W 4/024; H04W 4/40
USPC ....................................................... 701/420
See application file for complete search history.

(56) References Cited

U.S. PATENT DOCUMENTS

| 8,798,909 B2 * | 8/2014 | Ashby ................. G07C 5/0858 |
| | | 701/410 |
| 8,996,234 B1 | 3/2015 | Tamari et al. |
| 9,064,288 B2 * | 6/2015 | Abhyanker ............. G06F 21/62 |
| 9,141,582 B1 * | 9/2015 | Brinkmann ........... B60W 40/09 |

(Continued)

FOREIGN PATENT DOCUMENTS

WO   WO-2022090903 A1 *   5/2022  ......... G01C 21/3461

*Primary Examiner* — Atul Trivedi

(74) *Attorney, Agent, or Firm* — Faegre Drinker Biddle & Reath LLP

(57) ABSTRACT

A system and methods relate to, inter alia, aggregating geolocation data and auxiliary data associated with a plurality of driving activities. The system and methods may further identify the plurality of driving activities that have common geolocation data points based on a geolocation threshold. The system and methods may further determine, from among the identified plurality of driving activities, one or more designated driving activities based on an auxiliary threshold. The system and methods may further generate the neighborhood map that includes the one or more designated driving activities. The system and methods may further transmit a visual representation of, or electronic message detailing, the neighborhood map to a mobile device of a user for display, or otherwise causing the neighborhood map to be displayed to the user.

27 Claims, 10 Drawing Sheets

(56) References Cited

U.S. PATENT DOCUMENTS

| | | | |
|---|---|---|---|
| 9,141,995 B1* | 9/2015 | Brinkmann | G07C 5/02 |
| 9,349,285 B1 | 5/2016 | Fowe | |
| 9,674,660 B1* | 6/2017 | Vaynblat | G06F 16/9537 |
| 9,743,239 B1* | 8/2017 | Mishra | H04W 4/023 |
| 9,826,345 B2* | 11/2017 | Haro | H04W 4/021 |
| 10,599,818 B2 | 3/2020 | Patton et al. | |
| 11,372,876 B1* | 6/2022 | Drozd | G06F 16/29 |
| 2010/0207751 A1* | 8/2010 | Follmer | G01C 21/32 340/439 |
| 2012/0123806 A1 | 5/2012 | Schumann et al. | |
| 2013/0030873 A1 | 1/2013 | Davidson | |
| 2013/0297175 A1 | 11/2013 | Davidson | |
| 2013/0304348 A1 | 11/2013 | Davidson et al. | |
| 2014/0039839 A1 | 2/2014 | Yuen et al. | |
| 2014/0236946 A1* | 8/2014 | Abhyanker | G06Q 50/01 707/737 |
| 2014/0350970 A1* | 11/2014 | Schumann, Jr. | G08G 1/096775 705/4 |
| 2015/0025917 A1 | 1/2015 | Stempora | |
| 2015/0266455 A1 | 9/2015 | Wilson | |
| 2016/0012472 A1* | 1/2016 | Nagaswami | G06Q 30/0265 705/14.62 |
| 2016/0171011 A1* | 6/2016 | Drogobetski | G06F 3/04842 707/722 |
| 2016/0335272 A1* | 11/2016 | Drogobetski | H04L 67/01 |
| 2016/0335814 A1* | 11/2016 | Tamari | G08G 1/0141 |
| 2017/0021764 A1 | 1/2017 | Adams et al. | |
| 2017/0048672 A1* | 2/2017 | Herz | H04W 8/18 |
| 2017/0061812 A1 | 3/2017 | Lahav et al. | |
| 2017/0072850 A1 | 3/2017 | Curtis et al. | |
| 2017/0140390 A1* | 5/2017 | Degeneffe | G06Q 10/1091 |
| 2017/0146360 A1 | 5/2017 | Averbuch | |
| 2017/0176192 A1 | 6/2017 | Cardoso De Moura | |
| 2017/0255966 A1 | 9/2017 | Khoury | |
| 2017/0372219 A1* | 12/2017 | Crawford | H04W 4/90 |
| 2018/0077538 A1 | 3/2018 | Matus et al. | |
| 2018/0107216 A1* | 4/2018 | Beaurepaire | B60W 50/08 |
| 2018/0130095 A1* | 5/2018 | Khoury | G01C 21/3617 |
| 2018/0164825 A1 | 6/2018 | Matus et al. | |
| 2018/0215380 A1 | 8/2018 | Devi | |
| 2019/0324475 A1 | 10/2019 | Dean et al. | |
| 2021/0182870 A1* | 6/2021 | Degeneffe | G06Q 10/1091 |
| 2021/0248633 A1* | 8/2021 | Simpson | G06Q 40/04 |
| 2021/0279796 A1* | 9/2021 | Simpson | G06Q 30/0206 |
| 2021/0342869 A1* | 11/2021 | Simpson | G06Q 40/06 |

* cited by examiner

SYSTEM AND METHOD OF CREATING CUSTOM DYNAMIC NEIGHBORHOODS FOR INDIVIDUAL DRIVERS

CROSS-REFERENCE TO RELATED APPLICATION

The present application is a continuation of U.S. Non-Provisional application Ser. No. 16/183,797, filed Nov. 8, 2018, the entire disclosure of which is hereby expressly incorporated herein by reference.

TECHNICAL FIELD

The present disclosure relates generally to logging driving activity, and particularly, inter alia, to a system and methods for generating a neighborhood map that includes one or more custom dynamic neighborhoods that indicate driving activity of a driver.

BACKGROUND

Auto-insurance premium is typically dependent on a driver's driving score, which quantifies how safe a driver is perceived to be by auto-insurance companies. Typically, to improve driving scores and hence lower premiums, a driver may drive within the speed limit, accelerate and brake smoothly, or drive corners and bends at safe speeds.

However, drivers are not provided effective logging tools to help them analyze their driving activities to drive more safely. Further, drivers are not given a believable benchmark that is a fair representation of their driving activities, and are not provided with any comparable information as to how other drivers that drive the same routes or sub-routes perform. One of the challenges that prevent development of effective logging tools is that drivers have dramatically different driving behaviors and tendencies based on driving routes or sub-routes they take. For instance, a driver may exhibit safer driving tendencies when driving in a foreign city, but may exhibit less safe driving tendencies when driving in a familiar city. For this reason, comparing how two people drive is difficult the driving routes they take can be dramatically different.

What is needed is a mechanism to log, measure, or save driving activities that provides drivers with a fair representation of their driving activities, as well as a way to compare two different but similarly situated drivers to incentive drivers to drive safer, thereby improving their driving scores.

BRIEF SUMMARY

The present embodiments disclose systems and methods that may generally relate to logging, measuring, or saving driving activity, and particularly, inter alia, to a system and methods for generating a neighborhood map that includes one or more custom dynamic neighborhoods that indicate driving activity of a driver.

To help incentivize drivers, such as with lower premiums in an auto-insurance plan, drivers need information pertinent to their driving activities to drive more safely. Such driving activities may be determined by aggregating geolocation data and auxiliary data associated with the driver's driving activities. Further, by identifying the driving activities that have common geolocation data points based on a geolocation threshold, driving activities that have the same or even substantially the same geolocation data points, can be grouped or categorized together so that driving routes and/or sub-routes can be identified and accordingly mapped for the driver. In addition, by determining, from among the identified driving activities, one or more designated driving activities based on an auxiliary threshold, frequently traversed driving routes and/or sub-routes for example can be determined and designated within the pool of grouped driving routes and/or sub-routes. By generating a neighborhood map that includes the one or more designated driving activities, which may exclude statistically insignificant driving activities (e.g., routes that have not been frequently traversed), and transmitting the neighborhood map to the driver, the driver may be able to obtain a focused neighborhood map that accurately portrays frequently traversed driving routes and/or sub-routes and that does not distract the driver with outliers (e.g., routes that have been relatively sparingly traversed).

Accordingly, in some embodiments, a system and methods may aggregate, via wireless communication or data transmission over one or more radio links or digital communication channels, geolocation data and auxiliary data associated with a plurality of driving activities. The system and methods may further identify the plurality of driving activities that have common geolocation data points based on a geolocation threshold. The system and methods may further determine, from among the identified plurality of driving activities, one or more designated driving activities based on an auxiliary threshold. The system and methods may further generate the neighborhood map that includes the one or more designated driving activities. Lastly, the system and methods may further transmit, via wireless communication or data transmission over one or more radio links or digital communication channels, a visual representation of, or electronic message detailing, the neighborhood map to a mobile device of a user for display, or otherwise causing the neighborhood map to be displayed to the user.

In some embodiments, an interconnected wireless communication system may include a processor, transceiver, sensors and one or more memory devices storing non-transitory computer readable instructions that when executed cause the processor to aggregate, via wireless communication or data transmission over one or more radio links or digital communication channels, geolocation data and auxiliary data associated with a plurality of driving activities. The instructions may further cause the processor to identify the plurality of driving activities that have common geolocation data points based on a geolocation threshold. The instructions may further cause the processor to determine, from among the identified plurality of driving activities, one or more designated driving activities based on an auxiliary threshold. The instructions may further cause the processor to generate the neighborhood map that includes the one or more designated driving activities. The instructions may further cause the transceiver to transmit a visual representation of, or electronic message detailing, the neighborhood map to a mobile device of a user for display, or otherwise causing the neighborhood map to be displayed to the user.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

DETAILED DESCRIPTION

The present embodiments may generally relate to a system and methods for logging, measuring, or saving driving activity, and particularly, inter alia, to a system and methods for generating a neighborhood map that includes one or more custom dynamic neighborhoods that indicate driving activity of a driver.

Figure 1:
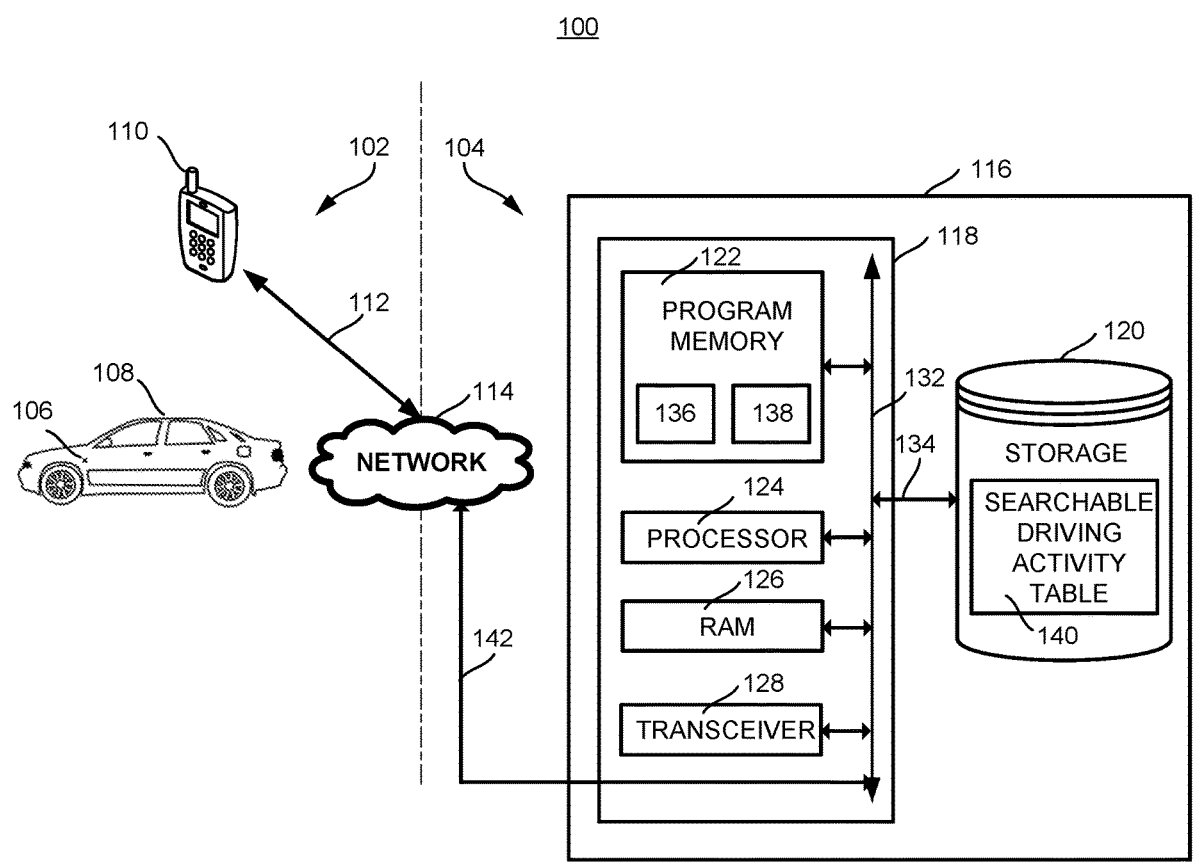
FIG. 1 illustrates a block diagram of an exemplary interconnected wireless communication system on which the methods described herein may be implemented according to some embodiments.

FIG. 1 illustrates a block diagram of an interconnected wireless communication system 100 in accordance with some embodiments on which the methods described herein may be implemented. The communication system 100 may generally be divided into front-end components 102 and back-end components 104, both of which may include hardware and software applications, as well as various data communications channels for communicating data between the various hardware and software components. The front-end components 102 may generate or record geolocation data and/or other data associated with a user's driving activity from mobile device-mounted sensors, vehicle-mounted sensors, smart infrastructure-mounted sensors, wearable electronics-mounted sensors, or other sensors. The geolocation data and/or other data may be in the form of vehicle data, geographic location data (e.g., GPS data), telematics data, mobile device data, vehicle-mounted sensor data, autonomous vehicle data, smart infrastructure sensor data, image data, or other data. Geolocation data and/or other data may provide contextual information of the vehicle 108 (e.g., a car, truck, motorcycle, bicycle) related to traffic, dates and times of vehicle use, duration of vehicle use, mobile device GPS location, vehicle GPS location, speed, RPM or other tachometer readings of the vehicle, lateral and longitudinal acceleration of the vehicle, environment (e.g., construction, accidents in the area, weather, road condition), or other information relating to use of the vehicle 108.

Front-end components 102 may include on-board computer or mobile device 110 (e.g., a smart phone, a cellular phone, a tablet computer, a special purpose or general use computing device, smart watch, wearable electronics such as augmented reality appliance, a GPS or vehicle navigation device, dedicated vehicle logging or control device, general-use on-board computer capable of performing many functions relating to vehicle operation or a dedicated computer for autonomous vehicle operation, and the likes), and one or more sensors 106 associated with vehicle 108. Examples of sensors 106 include a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor. Some of the sensors 106 (e.g., radar, LIDAR, or camera units) may actively or passively scan the vehicle environment for obstacles (e.g., other vehicles, buildings, pedestrians, etc.), roadways, lane markings, signs, or signals. Other sensors 106 (e.g., GPS, accelerometer, or tachometer units) may provide data for determining the location or movement of the vehicle 108. Other sensors 106 may be directed to the interior or passenger compartment of the vehicle 108, such as cameras, microphones, pressure sensors, thermometers, or similar sensors to log or measure the vehicle operator and/or passengers within the vehicle 108. The sensors 106 may also be removably or fixedly incorporated within or connected to the board computer or mobile device 110 and may be disposed in various arrangements.

In various embodiments, the on-board computer or mobile device 110 may each be configured to execute one or more algorithms, programs, or applications to generate or record geolocation data and/or auxiliary data associated with a user's driving activity from one or more sensors 106 mounted or installed within the vehicle 108. For example, on-board computer or mobile device 110 may generate or record geolocation data associated with a user's driving activity from one or more sensors 106 such as a GPS unit. As another example, on-board computer or mobile device 110 may generate or record other data associated with a user's driving activity from one or more sensors 106 such as a GPS unit.

In some embodiments, a "driving activity" refers to a driving route or driving sub-route, the plurality of which comprises the driving route. As an example, a driving route may comprise a route originating from a user's home and ending at a user's workplace. Using the same example, a driving sub-route may comprise any discrete portion of the driving route, such as the portion of the route originating from a user's home and ending halfway between the user's home and the user's workplace, the portion of the route originating from a user's home and ending a quarter way between the user's home and the user's workplace, or the portion of the route originating from a user's home and ending at an intersection nearest to the user's home. Such driving sub-route need not originate from the starting location of the driving route. Using the same example described above, the driving sub-route may be a portion of the route originating from the halfway point between the user's home and the user's workplace and ending at the interest nearest to the halfway point.

In some embodiments, geolocation data includes a series of consecutive and discrete geolocation data points (e.g., latitude and longitude coordinates, addresses, street intersections, etc.) with an optional timestamp for each geolocation data point. In some embodiments, geolocation data includes starting and ending discrete geolocation data points (e.g., latitude and longitude coordinates, addresses, street intersections, etc.) with an optional timestamp for each geolocation data point. In various embodiments, on-board computer or mobile device 110 may also be configured to record or generate auxiliary data associated with the driving activity. In some embodiments, auxiliary data includes, but is not limited to, a time stamp, speed (e.g., average and/or maximum speed per driving sub-route and/or driving route, in which average speed, for example, can be derived from time and GPS information), acceleration, travel frequency, braking, or a driving score (driving score will be calculated by server and sent back to user) calculated from any of the aforementioned auxiliary data examples. Auxiliary data can be recorded at various granularities. For example, auxiliary data can correspond to each geolocation data point, the driving route (e.g., the auxiliary data includes averages of the metrics for a plurality of sub-routes), and/or one or more driving sub-routes. As an example, a user can use on-board computer or mobile device 110 while driving. At the end of the drive, the user can review his performance with the recorded geolocation data (e.g., using a user interface of on-board computer or mobile device 110) to observe the driving sub-route and/or driving route that the user traversed, how fast and how long the user finished it in, average speed, acceleration and braking patterns, driving score, and/or other metrics.

In some embodiments, the front-end components 102 may be configured to store the recorded geolocation data and the auxiliary data and/or send the recorded data associated with the driving activity to back-end components 104, such as the server 116, via a network 114. As such, the back-end components 104 may receive geolocation data and/or auxiliary data associated with a user's driving activity that was generated or recorded by the front-end components 102. The on-board computer or mobile device 110 may be configured to send geolocation data and/or auxiliary data to and/or receive data from network 114 using one or more suitable communication protocols, such as a Wi-Fi direct protocol, an ad-hoc cellular communication protocol, and the likes. Network 114 may be a proprietary network, a secure public internet, a virtual private network or some other type of network, such as dedicated access lines, plain ordinary telephone lines, satellite links, cellular data networks, or a combination thereof. Network 114 may be implemented as a wireless telephony network (e.g., GSM, CDMA, LTE, etc.), a Wi-Fi network (e.g., via one or more IEEE 802.11 Standards), a WiMAX network, a Bluetooth network, and the likes. The network 114 may include one or more radio frequency communication links, such as wireless communication links 112 with the on-board computer or mobile device 110. Where the network 114 comprises the Internet, data communications may take place over the network 114 via an Internet communication protocol.

In some embodiments, on-board computer or mobile device 110 is configured to send the recorded data associated with the driving activity to server 116 during the driving activity (e.g., in real-time) and/or after the driving activity has been completed. In some embodiments, on-board computer or mobile device 110 is configured to receive recorded geolocation data and auxiliary data associated with driving activity subsequent to the completion of the activity (e.g., such information is uploaded to on-board computer or mobile device 110). In some embodiments, on-board computer or mobile device 110 is configured to present an interactive user interface. The user interface may display geolocation data and auxiliary data associated with a user's driving activity. In some embodiments, the user interface may display geolocation data and auxiliary data associated with driving activity of other drivers, preferably where driving activity of other drivers overlap with the driving activity of the user. In such embodiments, by using the user interface, the user may visually be able to compare various auxiliary data associated with the user's driving activity with those of other drivers.

Server 116 may aggregate recorded geolocation data and auxiliary data associated with a user's driving activity from the front-end components 102 via the network 114, store the recorded geolocation data and auxiliary data in storage 120 or program memory 122, process the received recorded geolocation data and auxiliary data, and/or communicate information associated with the received or processed recorded geolocation data and auxiliary data back to the front-end components 102. Further, the server 116 may access data stored in storage 120 when executing various functions and tasks associated with generating a neighborhood map depicting the user's driving activity. In some embodiments, the recorded data received at server 116 is received during the user's driving activity (e.g., in real-time) and/or subsequent to the completion of the user's driving activity. Server 116 is configured to store information associated with each driving activity. For example, information associated with each driving activity includes an identifier associated with the user that performed the driving activity, the date and/or period of time during which the driving activity took place, the device type that was used to record the driving activity data, and the vehicle used by the user during the driving activity. In some embodiments, the information associated with each driving activity is stored by server 116 in a searchable driving activity table 140 that comprises a SQL-based data table. Server 116 is configured to store the set of geolocation data and/or a corresponding auxiliary data associated with (e.g., recorded geolocation data point along) each driving activity.

The server 116 may comprise a controller 118 that is operatively connected to the storage 120 via a link 134. The controller 118 may include a program memory 122, a processor 124, a random-access memory (RAM) 126, and a transceiver 128, all of which may be interconnected via an address/data bus 132. The controller 118 may also be operatively connected to the network 114 via wireless communication or data transmission over one or more radio links 142 or digital communication channels. Specifically, transceiver 128 may interface with the processor 124 and communicate, via link 142, to the network 114 and any device communicatively coupled to the network 114, such as on-board computer or mobile device 110. The memory of the controller 118 may include multiple RAMs 126 and multiple program memories 122. The RAM 126 and program memory 122 may be implemented as semiconductor memories, magnetically readable memories, or optically readable memories, for example. The program memory 122 may store various software applications, which may include a designated driving activities application 136 and a user neighborhood map generation application 138. The various software applications may be executed by the same computer processor 124 or by different computer processors. Designated driving activities application 136 and a user neighborhood map generation application 138 can be implemented, for example, as distinct or integrated software components, which can include module(s), package(s), and/or other sub-components to provide an executable computer program that can perform these described functions when executed on a processor, and can be implemented using a programming language such as C, C++, Java, Objective C, and/or other programming languages.

The designated driving activities application 136 is configured to determine, from the set of geolocation data and/or a corresponding auxiliary data associated with each driving activity, one or more designated driving activities representative of the most frequently traversed driving activity or activities among each driving activity. As shown in further detail with reference to FIGS. 4A, 4B, 5A, 5B, 6A, and 6B, the designated driving activities application 136 may search the activity table to identify a plurality of driving activities that have common geolocation data, such as a series of consecutive and discrete geolocation data points (e.g., latitude and longitude coordinates, addresses, street intersections, etc.), starting and/or ending discrete geolocation data points (e.g., latitude and longitude coordinates, addresses, street intersections, etc.), and/or common time stamps associated with each geolocation data point. In such a search, the designated driving activities application 136 may be configured to identify two discrete geolocation data points as "common" if the discrete geolocation data points are exactly the same (i.e., the distance between the two discrete geolocation data points meet a geolocation threshold of zero), or if the discrete geolocation data points are substantially the same (i.e., the distance between the two discrete geolocation data points meet a geolocation threshold of a predetermined value). In some embodiments, the designated driving activities application 136 may be configured to perform spatial indexing on the set of geolocation data and/or a corresponding auxiliary data associated with each driving activity to aid searching the activity table. In some embodiments, in performing spatial indexing, the information from the activity table and the geolocation data and corresponding auxiliary data drive pertaining to each driving activity are aggregated and recorded for each recorded geolocation data point and put into a PostGIS database or other spatially enabled and indexed data structure. The designated driving activities application 136, with or without spatial indexing capabilities, may determine one or more designated driving activities that are representative of the plurality of driving activities that have common geolocation data and/or common time stamps associated with each geolocation data point. Such one or more designated driving activities are representative of the most frequently traversed driving activity or activities among each driving activity. Designated driving activities application 136 is configured to send the geolocation data and/or a corresponding auxiliary data associated with the one or more designated driving activities to user neighborhood map generation application 138.

User neighborhood map generation application 138 is configured to receive the geolocation data and/or a corresponding auxiliary data associated with the one or more designated driving activities from designated driving activities application 136. User neighborhood map generation application 138 is configured to obtain a reference map stored in memory 122 or from a third party data server (not shown). For example, the reference map may comprise a set of GIS data that describes roads and paths with edges. For example, the reference map may comprise a set of GIS data from Topologically Integrated Geographic Encoding and Referencing (TIGER) or Open Street Map. As will be described in detail below, to generate a user neighborhood map, user neighborhood map generation application 138 is configured to determine a plurality of edges in a region of the reference map that match the geolocation data associated with the one or more designated driving activities and optionally store the metadata (e.g., geolocation data and auxiliary data) associated with the matched plurality of edges in the region of the reference map. The user neighborhood map generation application 138 is configured to generate, on the user neighborhood map, visual representations of the plurality of edges in the region of the reference map that match the geolocation data and/or a corresponding auxiliary data associated with the one or more designated driving activities. In some embodiments, the user neighborhood map generation application 138 is configured to generate, on the user neighborhood map, the visual representations of the plurality of edges in the region of the reference map that match the geolocation data associated with the one or more designated driving activities, along with the corresponding auxiliary data. In some embodiments, the user neighborhood map generation application 138 is configured to generate, on the user neighborhood map, the visual representations of the plurality of edges in the region of the reference map that match the geolocation data associated with the one or more designated driving activities, along with the corresponding auxiliary data associated with the user and looked-up auxiliary data associated with driving activity of other drivers. The user neighborhood map generation application 138 may send the generated user neighborhood map that includes the visual representations of the plurality of edges in the region of the reference map that match the geolocation data associated with the one or more designated driving activities and/or the corresponding auxiliary data of the user and/or other drivers to the on-board computer or mobile device 110 such that the on-board computer or mobile device 110 may present the generated user neighborhood map on its interactive user interface. Accordingly, by using the user interface, the user may visually be able to view most frequently traversed driving activity or activities, and optionally auxiliary data associated with each activity or activities of the user as well as of other drivers.

In some embodiments, user neighborhood map generation application 138 is configured to receive user inputs from a device such as on-board computer or mobile device 110. In some embodiments, the received user inputs are associated with driving activity display preferences. In some embodiments, the received user inputs may be associated with a specified time interval, day of the week, start and/or end points. As will be described below, in some embodiments, in response to the user inputs from on-board computer or mobile device 110 for driving activity display preferences, User neighborhood map generation application 138 is configured to generate, on the user neighborhood map, the visual representations of one or more traversed driving activity that match the received time interval, day of the week, start and/or end points. In some embodiments, user neighborhood map generation application 138 is able to support generation of the neighborhood map by including logic configured to interact with the Application Programming Interface (API) of a map software/application (e.g., Google® Maps, MapQuest®, Bing® maps, and/or another mapping application/service).

In some embodiments, one or more portions of the server 116 may be implemented as one or more storage devices that are physically co-located with server 116, or as one or more storage devices utilizing different storage locations as a shared database structure (e.g., cloud storage). In some embodiments, on-board computer or mobile device 110 may be configured to perform any suitable portion of the processing functions locally that have been remotely outsourced to server 116. For example, mobile device 110 may aggregate recorded geolocation data and auxiliary data associated with a user's driving activity, store the recorded geolocation data and auxiliary data in storage 120 or program memory 122, and/or process the received recorded geolocation data and auxiliary data. To determine, from the set of geolocation data and/or a corresponding auxiliary data associated with each driving activity, one or more designated driving activities representative of the most frequently traversed driving activity or activities among each driving activity, and further to generate, on the user neighborhood map, visual representations of the plurality of edges in the region of the reference map that match the geolocation data associated with the one or more designated driving activities.

In some embodiments, the server 116 may be part of an insurer computing system (or facilitate communications with an insurer computer system), and as such, may access insurer databases as needed to perform insurance-related functions. Accordingly, data received from on-board computer or mobile device 110 may include user credentials, which may be verified by server 116 or one or more other external computing devices or servers. These user credentials may be associated with an insurance profile, which may include, for example, financial account information, insurance policy numbers, a description and/or listing of insured assets, vehicle identification numbers of insured vehicles, addresses of insured users, contact information, premium rates, discounts, and the likes. In this way, data received from on-board computer or mobile device 110 may allow server 116 to uniquely identify each insured customer. In addition, server 116 may facilitate the communication of the updated insurance policies, premiums, rates, discounts, and the likes to their insurance customers for their review, modification, and/or approval.

Although the system 100 is shown to include one vehicle 108, one on-board computer or mobile device 110, and one server 116, it should be understood that additional vehicles 108, on-board computers or mobile devices 110, and/or servers 116 may be utilized. For example, the system 100 may include a plurality of servers 116 and hundreds of on-board computers or mobile devices 110, all of which may be interconnected via the network 114. For example, one of the servers 116 may be dedicated for determining one or more designated driving activities representative of the most frequently traversed driving activity or activities among each driving activity, and another one of the servers 116 may be dedicated for generating, on the user neighborhood map, visual representations of the plurality of edges in the region of the reference map that match the geolocation data associated with the one or more designated driving activities. Furthermore, the database storage or processing performed by the one or more servers 116 may be distributed among a plurality of servers 116 in a cloud computing arrangement. This configuration may provide various advantages, such as enabling near real-time uploads and downloads of information, as well as periodic uploads and downloads of information. This may in turn support a thin-client embodiment of the on-board computers or mobile devices 110 discussed herein.

Figure 2:
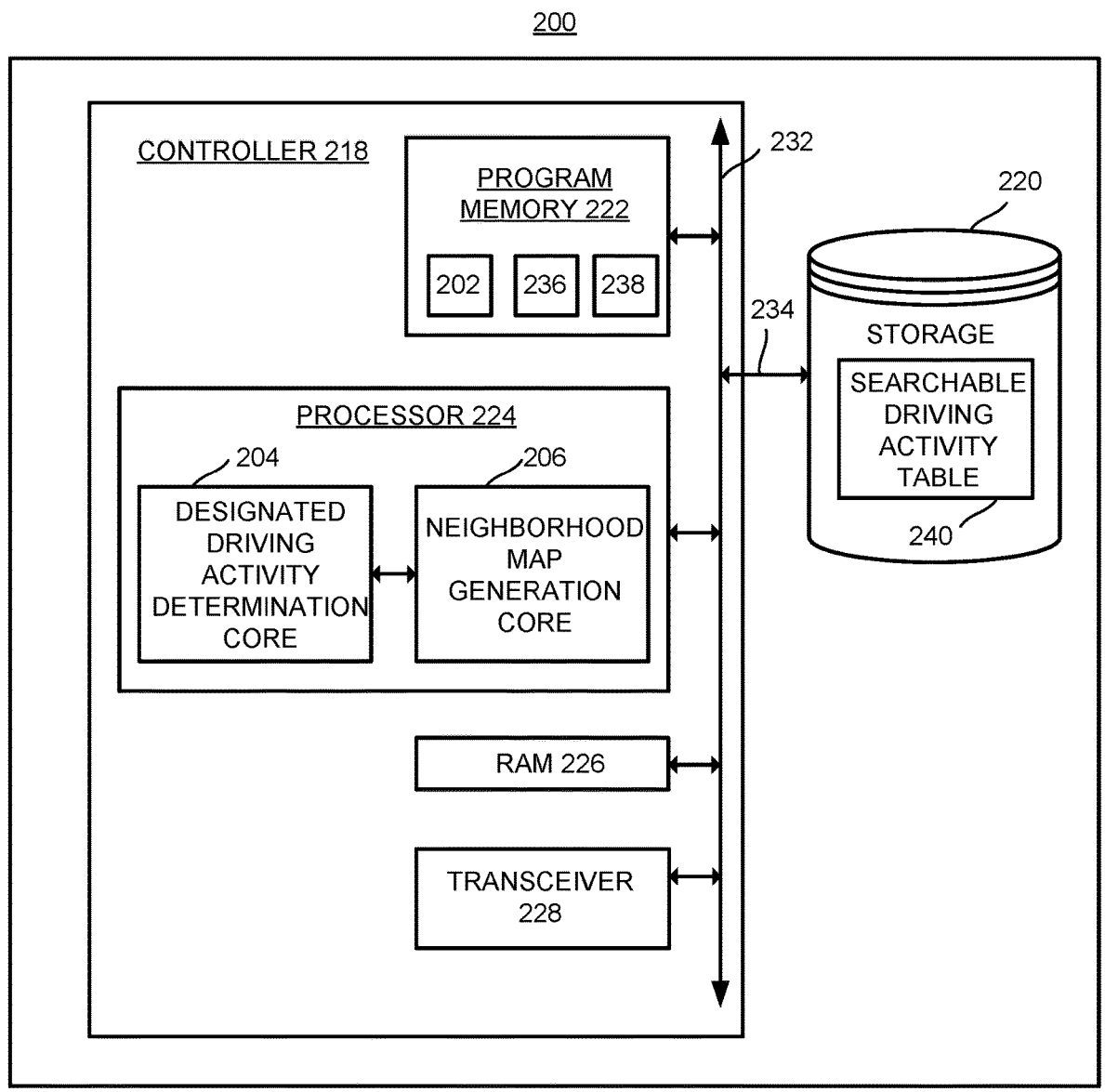
FIG. 2 illustrates a block diagram of an exemplary server according to some embodiments.

FIG. 2 is a diagram showing an example of a server 200 in accordance with some embodiments. In some embodiments, server 116 of system 100 of FIG. 1 may be implemented with the example server 200 of FIG. 2. As shown in FIG. 2, the server 200 includes program memory 222 that stores geolocation and/or auxiliary data collection engine 202, and processor 224 having designated driving activity determination core 204 and neighborhood map generation core 206. Each core can be implemented, for example, as distinct or integrated processing units that read and execute program instructions, such as applications 236 and 238.

The geolocation and/or auxiliary data collection engine 202 is configured to aggregate recorded geolocation data and auxiliary data associated with a user's driving activity from devices such as on-board computer or mobile device 110 and/or sensors 106. In some embodiments, the recorded data received at geolocation and/or auxiliary data collection engine 202 is received during the user's driving activity (e.g., in real-time) and/or subsequent to the completion of the user's driving activity. Geolocation and/or auxiliary data collection engine 202 is configured to log, measure, or save information associated with each driving activity. For example, information associated with each driving activity includes an identifier associated with the user that performed the driving activity, the date and/or period of time during which the driving activity took place, the device type that was used to record the driving activity data, and the vehicle used by the user during the driving activity. In some embodiments, the recorded geolocation data and/or a corresponding auxiliary data is stored at storage 220 and/or program memory 222. In some embodiments, the information associated with each driving activity is stored into a searchable activity table in storage 220 and/or program memory 222 that comprises a SQL-based data table. Geolocation and/or auxiliary data collection engine 202 is configured to log, measure, or save the set of geolocation data and/or a corresponding auxiliary data associated with (e.g., recorded geolocation data point along) each driving activity in storage 220 and/or program memory 222. In some embodiments, the geolocation and/or auxiliary data collection engine 202 is configured to send the set of geolocation data and/or a corresponding auxiliary data associated with each driving activity to the designated driving activity determination core 204.

A designated driving activity determination core 204 is configured to execute designated driving activities application 236 to receive the set of geolocation data and/or a corresponding auxiliary data associated with each driving activity from geolocation and/or auxiliary data collection engine 202. Subsequently, the designated driving activity determination core 204 is configured to, via execution of designated driving activities application 236, determine from it one or more designated driving activities that is, for example, representative of the most frequently traversed driving activity or activities among each driving activity, based on a predeterminable auxiliary threshold. As shown in further detail with reference to FIGS. 4A, 4B, 5A, 5B, 6A, and 6B, generally, the designated driving activity determination core 204 may, via execution of designated driving activities application 236, search the activity table to identify a plurality of driving activities, such as a series of consecutive and discrete geolocation data points (e.g., latitude and longitude coordinates, addresses, street intersections, etc.), that have common geolocation data, such as common starting, intermediate, and/or ending discrete geolocation data points). In such a search, the designated driving activity determination core 204, via execution of designated driving activities application 236, may be configured to identify two discrete geolocation data points as "common" if the discrete geolocation data points are exactly the same (e.g., latitude and longitude coordinates, addresses, street intersections, etc. are exactly the same), or if the discrete geolocation data points are substantially the same (i.e., the distance between the two discrete geolocation data points meet a predeterminable geolocation threshold). For example, geolocation data points 41.8789° N, 87.6359° W and 41.8787° N, 87.6357° W, in some embodiments, may be substantially the same if the predeterminable geolocation threshold is 0.0002. As another example, the street intersection of Main Street and Second Street may be substantially the same as the street intersection of Main Street and Second Street if the distance between First Street and Second Street meets a predeterminable geolocation threshold, such as 20 feet. In some embodiments, the designated driving activity determination core 204, via execution of designated driving activities application 236, may be configured to perform spatial indexing on the set of geolocation data and/or a corresponding auxiliary data associated with each driving activity to aid searching the activity table. In some embodiments, in performing spatial indexing, the information from the activity table and the geolocation data and corresponding auxiliary data drive pertaining to each driving activity are aggregated and recorded for each recorded geolocation data point and put into a PostGIS database or other spatially enabled and indexed data structure. The designated driving activity determination core 204, via execution of designated driving activities application 236, with or without spatial indexing capabilities, may determine one or more designated driving activities that are representative of the plurality of driving activities that have common geolocation data and/or common time stamps associated with each geolocation data point. Such one or more designated driving activities may be representative of the most frequently traversed driving activity or activities among each driving activity. In some embodiments, the geolocation data and/or a corresponding auxiliary data associated with the one or more designated driving activities is stored by designated driving activity determination core 204 in storage 220 and/or program memory 222, or another dedicated data storage (not pictured). In some embodiments, the designated driving activity determination core 202 is configured to send the geolocation data and/or a corresponding auxiliary data associated with the one or more designated driving activities to the neighborhood map generation core 206.

Neighborhood map generation core 206 is configured to receive the geolocation data and/or a corresponding auxiliary data associated with the one or more designated driving activities from designated driving activity determination core 202. Neighborhood map generation core 206 is configured to execute user neighborhood map generation application to obtain a reference map stored in program memory 222 or from a third party data server (not pictured). For example, the reference map may comprise a set of GIS data that describes roads and paths with edges. For example, the reference map may comprise a set of GIS data from Topologically Integrated Geographic Encoding and Referencing (TIGER) or Open Street Map. As will be described in detail below, to generate a user neighborhood map, neighborhood map generation core 206, via user neighborhood map generation application, is configured to determine a plurality of edges in a region of the reference map that match the geolocation data associated with the one or more designated driving activities and optionally store the metadata (e.g., geolocation data and auxiliary data) associated with the matched plurality of edges in the region of the reference map. The neighborhood map generation core 206, via user neighborhood map generation application, is configured to generate, on the user neighborhood map, visual representations of the plurality of edges in the region of the reference map that match the geolocation data associated with the one or more designated driving activities. In some embodiments, the neighborhood map generation core 206, via user neighborhood map generation application, is configured to generate, on the user neighborhood map, the visual representations of the plurality of edges in the region of the reference map that match the geolocation data associated with the one or more designated driving activities, along with the corresponding auxiliary data. In some embodiments, the neighborhood map generation core 206, via user neighborhood map generation application, is configured to generate, on the user neighborhood map, the visual representations of the plurality of edges in the region of the reference map that match the geolocation data associated with the one or more designated driving activities, along with the corresponding auxiliary data associated with the user and looked-up auxiliary data associated with driving activity of other drivers. In some embodiments, the neighborhood map generation core 206, via user neighborhood map generation application, is configured to generate a plurality of user neighborhood maps having visual representations of the plurality of edges in the region of the reference map that match the geolocation data associated with each of the one or more designated driving activities. The neighborhood map generation core 206 may retrieve auxiliary data associated with driving activity of other drivers from either storage 220 and/or program memory 222 or the dedicated data storage (not pictured) to visually populate the user neighborhood map.

The transceiver 228 may receive the generated user neighborhood map that includes the visual representations of the plurality of edges in the region of the reference map that match the geolocation data associated with the one or more designated driving activities and/or the corresponding auxiliary data of the user and/or other drivers from the neighborhood map generation core 206 and subsequently transmit it to the on-board computer or mobile device 110 via network 114 such that the on-board computer or mobile device 110 may present the generated user neighborhood map on its interactive user interface. Accordingly, by using the user interface, the user may visually be able to view most frequently traversed driving activity or activities, and optionally auxiliary data associated with each activity or activities of the user as well as of other drivers. In some embodiments, the neighborhood map generation core 206 is configured to store the generated user neighborhood map in storage 220 and/or program memory 222 or another dedicated data storage (not pictured), such that the on-board computer or mobile device 110 may retrieve the generated user neighborhood map for display on its interactive user interface.

In some embodiments, neighborhood map generation core 206 is configured to receive user inputs from a device such as on-board computer or mobile device 110. In some embodiments, the received user inputs are associated with designated driving activity display preferences. In some embodiments, the received user inputs may be associated with a specified time interval, day of the week, start and/or end points. As will be described below, in some embodiments, in response to the user inputs from on-board computer or mobile device 110 for designated driving activity display preferences, neighborhood map generation core 206 is configured to generate, on the user neighborhood map, the visual representations of one or more designated driving activities that match the received time interval, day of the week, start and/or end points. For example, the user inputs may include start and/or end points (e.g., home address to work address), and in response, the neighborhood map generation core 206 may generate a user neighborhood map that includes the visual representations of the designated driving activity having corresponding auxiliary data that match the start and/or end points (e.g., home address to work address). In some embodiments, the received user inputs may be associated with whether the user desires to view auxiliary data associated with driving activity of the user and/or other drivers. In such embodiments, the neighborhood map generation core 206 may generate a user neighborhood map that includes the visual representations of one or more designated driving activities having corresponding auxiliary data associated with driving activity of other drivers visually depicted on the user neighborhood map. Accordingly, by viewing an interactive user interface on the on-board computer or mobile device 110, a user may be able to view the user's auxiliary data and/or auxiliary of other drivers on the user neighborhood map, allowing the user to make comparisons to other drivers if desired. In some embodiments, neighborhood map generation core 206 is able to support generation of the neighborhood map by including logic configured to interact with the Application Programming Interface (API) of a map software/application (e.g., Google® Maps, MapQuest®, Bing® maps, and/or another mapping application/service).

Figure 3:
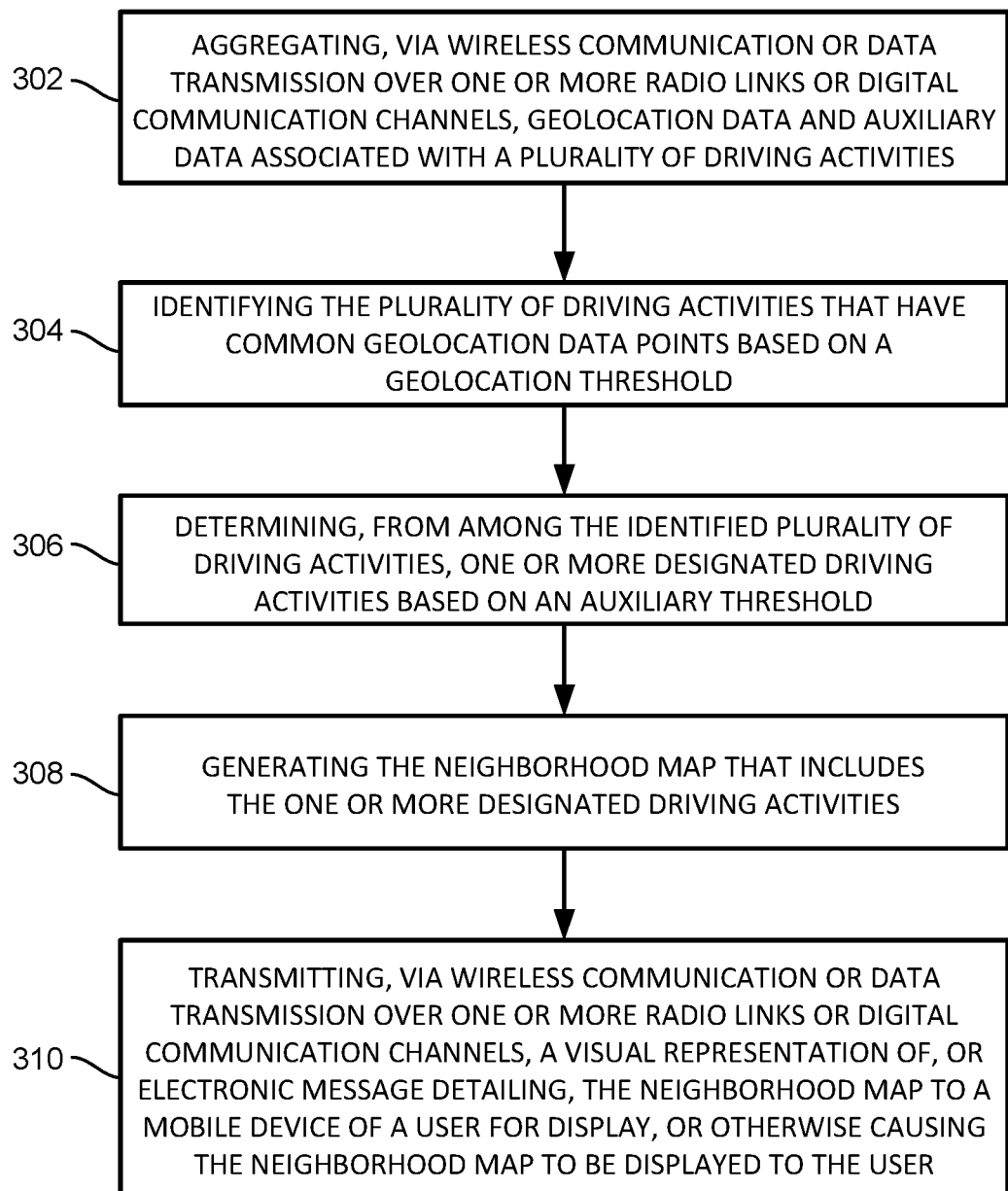
FIG. 3 illustrates an exemplary method for generating a neighborhood map according to some embodiments.

FIG. 3 is an exemplary method 300 for generating a neighborhood map in accordance with some embodiments. As shown in FIG. 3, method 300, carried out by the server 200 for example, may begin by aggregating, via wireless communication or data transmission over one or more radio links or digital communication channels, geolocation data and auxiliary data associated with a plurality of driving activities (e.g., driving routes and/or sub-routes), as shown in block 302. The source of such geolocation data and auxiliary data may be from sensors 106. Method 300 may proceed by identifying the plurality of driving activities that have common geolocation data points based on a geolocation threshold, as shown in block 304. As will be evident in FIGS. 4A, 4B, 5A, 5B, 6A, and 6B, by using common geolocation data points based on a geolocation threshold, driving activities that have the same or even substantially the same geolocation data points, can be grouped or categorized together so that driving routes and/or sub-routes can be identified and accordingly mapped. Method 300 may proceed by determining, from among the identified plurality of driving activities, one or more designated driving activities based on an auxiliary threshold, as shown in block 306. As such, within the pool of grouped driving routes and/or sub-routes, frequently traversed driving routes and/or sub-routes for example can be determined and designated. Method 300 may proceed by generating the neighborhood map that includes the one or more designated driving activities, as shown in block 308. By generating a neighborhood map that provides only the designated driving activities and excludes statistically insignificant driving activities (e.g., routes that have not been frequently traversed), a user may be able to obtain a focused neighborhood map that accurately portrays frequently traversed driving routes and/or sub-routes and that does not distract the user with outliers. Method 300 may proceed by transmitting, via wireless communication or data transmission over one or more radio links or digital communication channels, a visual representation of, or electronic message detailing, the neighborhood map to a mobile device of a user for display, or otherwise causing the neighborhood map to be displayed to the user, as shown in block 310.

Figure 4A:
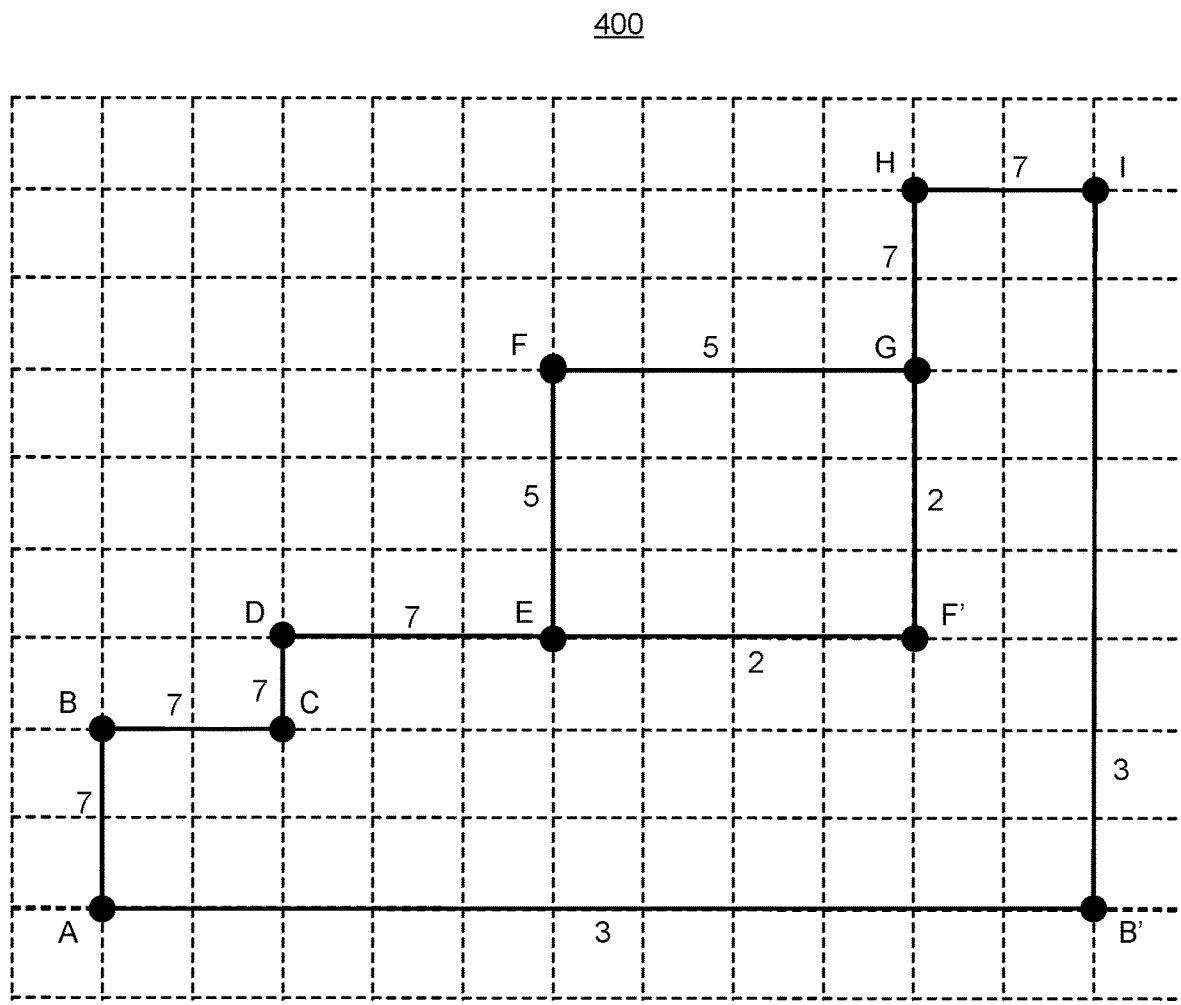
FIG. 4A illustrates exemplary geolocation data and corresponding auxiliary data associated with driving activities of a user according to some embodiments.

FIG. 4A is a diagram showing an example of geolocation data and corresponding auxiliary data associated with driving activities 400 of a user that has been detected by one or more sensors 106 of vehicle 108 in accordance with some embodiments. As shown, GSP data may be consecutive and discrete geolocation data points (e.g., A, B, B' C, D, E, F, F', G, H, and I). Such geolocation data points may be latitude and longitude coordinates, addresses, street intersections, etc. Point A may be a starting discrete geolocation data point, point I may be an ending discrete geolocation data point, and points B, B', C, D, E, F, F', G, and H may be intermediate discrete geolocation data points between points A and I. Accordingly, FIG. 4A depicts several driving activities 400 (e.g., 3 driving routes) starting from point A and ending at point I (i.e., A-B-C-D-E-F-G-H-I, A-B-C-D-E-F'-G-H-I, and A-B'-I), each driving route comprising several sub-routes (e.g., A-B, B-C, C-D, A-B', F'-G, A-C. D-G. etc.). FIG. 4A also depicts auxiliary data (e.g., travel frequency in units of the number of times traversed) for each sub-route for each driving route. For example, the driving activities 400 indicates that the user traversed sub-routes A-B, B-C, C-D, D-E, E-F, F-G, G-H, and H-I of route A-B-C-D-E-F-G-H-I a total of 7, 7, 7, 7, 5, 5, 7, and 7 times, respectively. Similarly, the driving activities 400 indicates that the user traversed sub-routes A-B, B-C, C-D, D-E, E-F', F'-G, G-H, and H-I of route A-B-C-D-E-F'-G-H-I a total of 7, 7, 7, 7, 2, 2, 7, and 7 times, respectively. Similarly, the driving activities 400 indicates that the user traversed sub-routes A-B' and B'-I of route A-B'-I a total of 3 and 3 times, respectively. Although not pictured, other auxiliary data may correspond to each sub-route, such as a time stamp, speed, acceleration, braking, or a driving score.

Figure 4B:
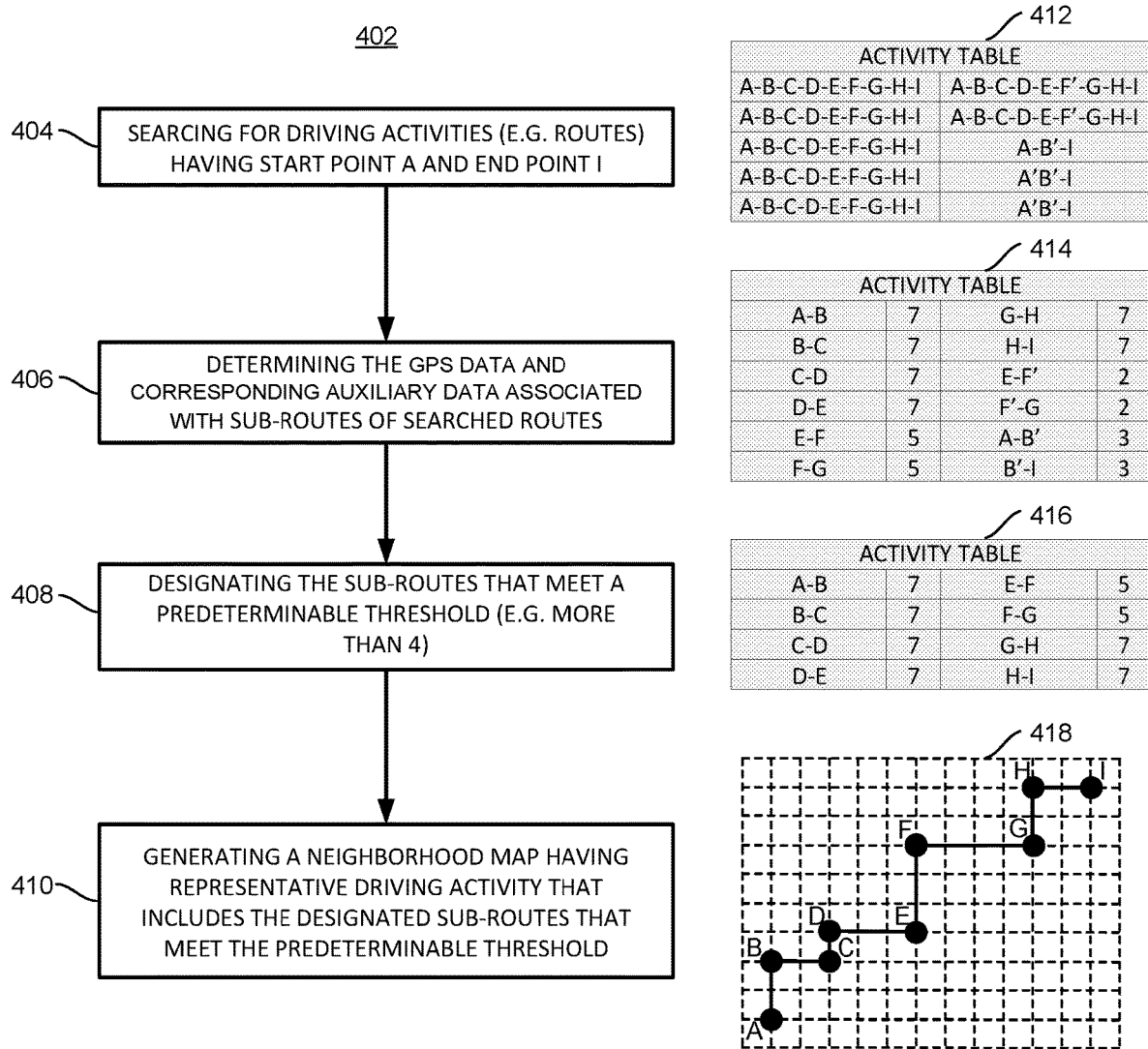
FIG. 4B illustrates an exemplary method for generating a neighborhood map showing the most frequently traversed driving activity for a user having driving activities as depicted in FIG. 4A in accordance with some embodiments.

FIG. 4B illustrates an example method 402 for generating a neighborhood map showing the most frequently traversed driving activity for a user having driving activities 400 as depicted in FIG. 4A in accordance with some embodiments. Method 402, carried out by the designated driving activity determination core 204 and the neighborhood map generation core 206 for example, may begin by searching for driving activities (e.g., routes) based on a certain criteria (e.g., routes having starting point A and ending point I), as shown in block 404. For example, after designated driving activity determination core 204 executes designated driving activities application 236 to receive the set of geolocation data and/or a corresponding auxiliary data associated with driving activities 400 from geolocation and/or auxiliary data collection engine 202, the designated driving activity determination core 204 may, via execution of designated driving activities application 236, search the activity table 240 to identify a plurality of driving activities (e.g., routes) that have common geolocation data, such as starting and ending discrete geolocation data points. Activity table 240 may show results 412 after such a search, which includes routes A-B-C-D-E-F-G-H-I, A-B-C-D-E-F'-G-H-I, and A-B'-I of driving activities 400. Method 402 may proceed by generally determining, by the designated driving activity determination core 204, one or more designated driving activities that are representative (e.g., most frequently travelled) of the plurality of driving activities. Specifically, for this to occur, method 402 may proceed by first determining the geolocation data and corresponding auxiliary data associated with sub-routes of the searched routes, as shown in block 406. Activity table 240 may show results 414 after such a determination. Results 414 show all the sub-routes that make up the searched routes, including the travel frequency for each sub-route. For instance, results 414 show that sub-route A-B has been traversed a total of 7 times, and sub-route B'-I has been traversed a total of 3 times. Next, method 402 may proceed by designating the sub-routes that meet a predeterminable threshold, as shown in block 408. For instance, if the designated driving activities application 236 is programmed to have an auxiliary threshold having a travel frequency of 4 or greater, activity table 240 may show results 416 after such a designation. As show in results 416, only sub-routes that have been traversed 4 or more times are listed (e.g., excludes sub-routes E-F', F'-G, A-B', and B'-I). The designated driving activity determination core 204 may then send the geolocation data and/or a corresponding auxiliary data associated with the one or more designated driving activities to the neighborhood map generation core 206. The neighborhood map generation core 206 may then generate a neighborhood map having representative driving activity 418 that includes the designated sub-routes that meet the predeterminable auxiliary threshold using the received geolocation data and/or a corresponding auxiliary data. As shown in results 418, only designated sub-routes A-B, B-C, C-D, D-E, E-F, F-G, G-H, and H-I, each of which have been traversed 4 or more times, appear. Neighborhood map generation core 206, via user neighborhood map generation application, may utilize edges of a reference map that match the geolocation data associated with designated driving activity 400 (as shown in results 416) to visually represent results 418. The neighborhood map generation core 206 may send the generated user neighborhood map to the on-board computer or mobile device 110 such that the on-board computer or mobile device 110 may present the generated user neighborhood map on its interactive user interface. Accordingly, by using the user interface, the user may visually be able to view most frequently traversed driving activity or activities, and optionally auxiliary data associated with each activity or activities of the user as well as of other drivers.

Figure 5A:
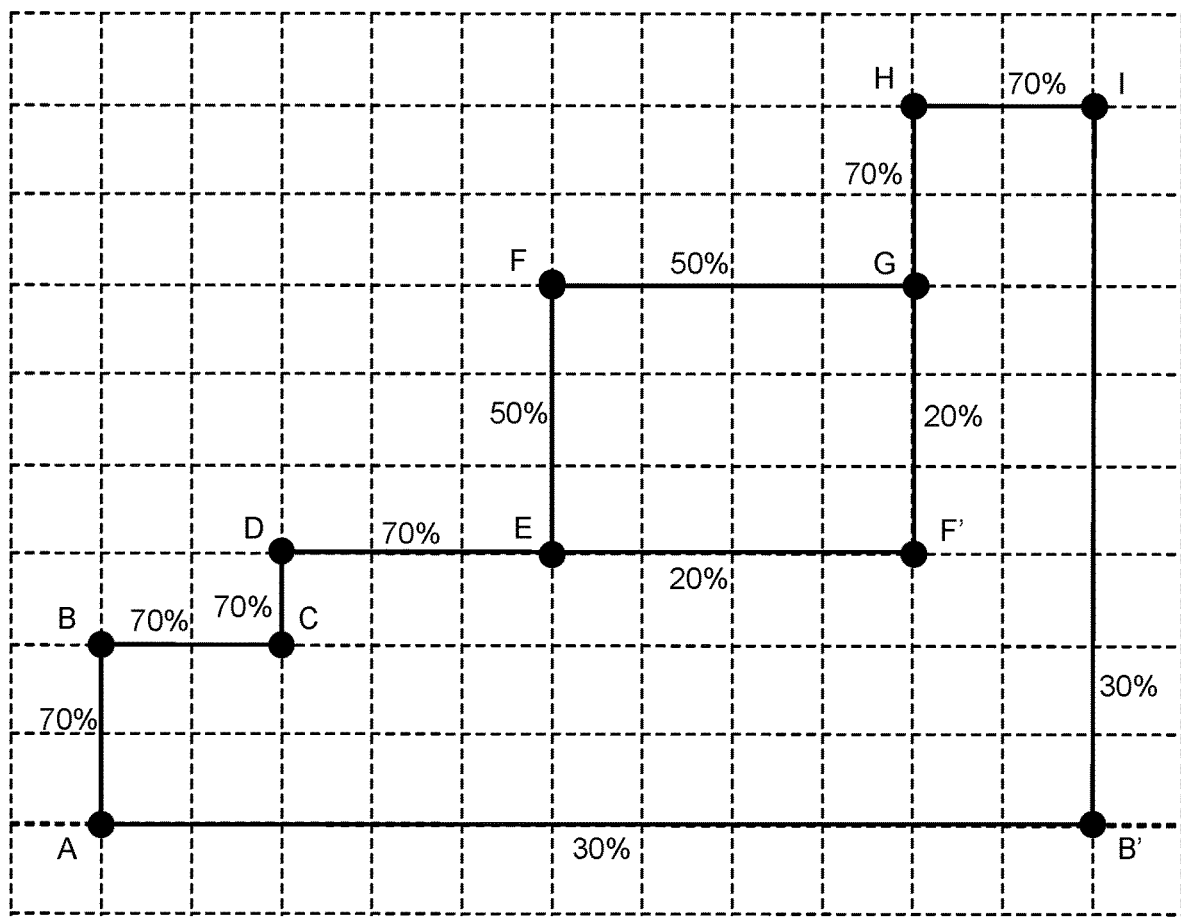
FIG. 5A illustrates exemplary geolocation data and corresponding auxiliary data associated with driving activities of a user according to some embodiments.

FIG. 5A is a diagram showing another example of geolocation data and corresponding auxiliary data associated with driving activities 500 of a user that has been detected by one or more sensors 106 of vehicle 108 in accordance with some embodiments. As shown, similar to FIG. 4A, the GSP data may be consecutive and discrete geolocation data points (e.g., A, B, B' C, D, E, F, F', G, H, and I). Such geolocation data points may be latitude and longitude coordinates, addresses, street intersections, etc. Point A may be a starting discrete geolocation data point, point I may be an ending discrete geolocation data point, and points B, B', C, D, E, F, F', G, and H may be intermediate discrete geolocation data points between points A and I. Accordingly, FIG. 5A depicts several driving activities 500 (e.g., 3 driving routes) starting from point A and ending at point I (i.e., A-B-C-D-E-F-G-H-I, A-B-C-D-E-F'-G-H-I, and A-B'-I), each driving route comprising several sub-routes (e.g., A-B, B-C, C-D, A-B', F'-G, A-C. D-G. etc.). FIG. 5A also depicts auxiliary data (e.g., travel frequency in units of percentages) for each sub-route for each driving route. For example, the driving activities 500 indicates that the user traversed sub-routes A-B, B-C, C-D, D-E, E-F, F-G, G-H, and H-I of route A-B-C-D-E-F-G-H-I 70%, 70%, 70%, 70%, 50%, 50%, 70%, and 70% of the time, respectively. Similarly, the driving activities 500 indicates that the user traversed sub-routes A-B, B-C, C-D, D-E, E-F', F'-G, G-H, and H-I of route A-B-C-D-E-F'-G-H-I 70%, 70%, 70%, 70%, 20%, 20%, 70%, and 70% of the time, respectively. Similarly, the driving activities 500 indicates that the user traversed sub-routes A-B' and B'-I of route A-B'-I 30% and 30% of the time, respectively. Although not pictured, other auxiliary data may correspond to each sub-route, such as a time stamp, speed, acceleration, braking, or a driving score.

Figure 5B:
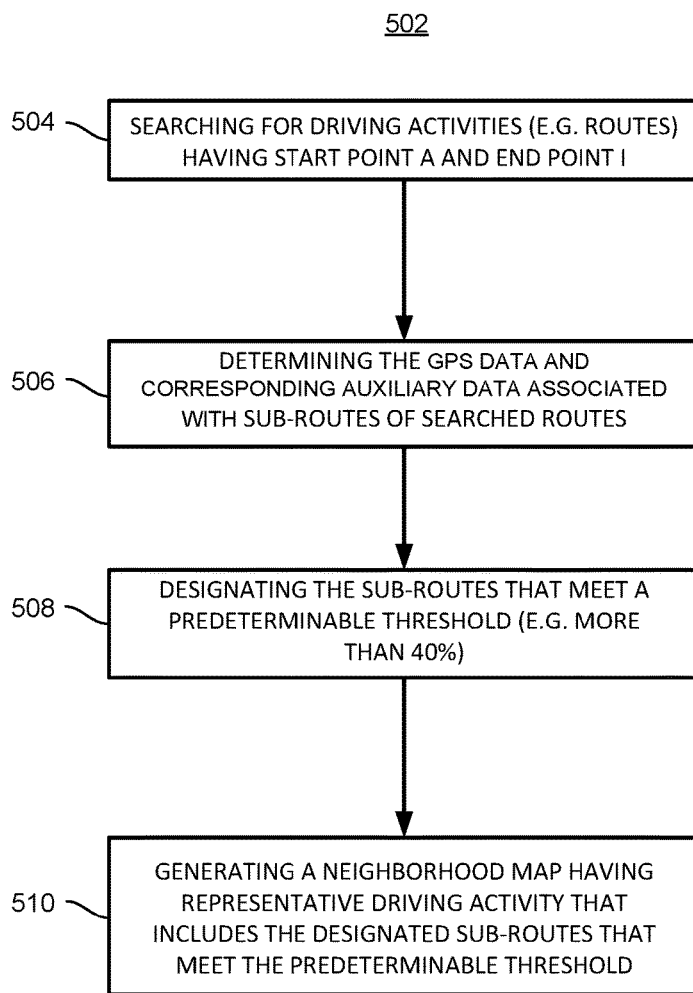
FIG. 5B illustrates an exemplary method for generating a neighborhood map showing the most frequently traversed driving activity for a user having driving activities as depicted in FIG. 5A in accordance with some embodiments.
Figure 5B:
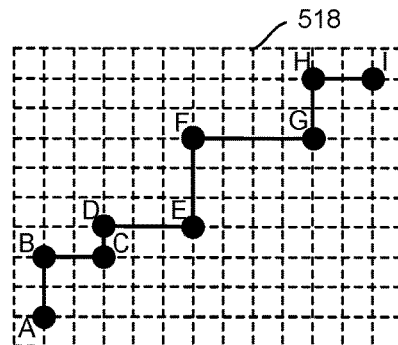

FIG. 5B illustrates an example method 502 for generating a neighborhood map showing the most frequently traversed driving activity for a user having driving activities 500 as depicted in FIG. 5A in accordance with some embodiments. Method 502, carried out by the designated driving activity determination core 204 and the neighborhood map generation core 206 for example, may begin by searching for driving activities (e.g., routes) based on a certain criteria (e.g., routes having starting point A and ending point I), as shown in block 504. For example, after designated driving activity determination core 204 executes designated driving activities application 236 to receive the set of geolocation data and/or a corresponding auxiliary data associated with driving activities 500 from geolocation and/or auxiliary data collection engine 202, the designated driving activity determination core 204 may, via execution of designated driving activities application 236, search the activity table 240 to identify a plurality of driving activities (e.g., routes) that have common geolocation data, such as starting and ending discrete geolocation data points. Activity table 240 may show results 512 after such a search, which includes routes A-B-C-D-E-F-G-H-I, A-B-C-D-E-F'-G-H-I, and A-B'-I of driving activities 500. Method 502 may proceed by generally determining, by the designated driving activity determination core 204, one or more designated driving activities that are representative (e.g., most frequently travelled) of the plurality of driving activities. Specifically, for this to occur, method 502 may proceed by first determining the geolocation data and corresponding auxiliary data associated with sub-routes of the searched routes, as shown in block 406. Activity table 240 may show results 514 after such a determination. Results 514 show all the sub-routes that make up the searched routes, including the travel frequency for each sub-route. For instance, results 514 show that sub-route A-B has been traversed 70% of the time, and sub-route B'-I has been traversed 30% of the time. Next, method 502 may proceed by designating the sub-routes that meet a predeterminable auxiliary threshold, as shown in block 508. For instance, if the designated driving activities application 236 is programmed to have an auxiliary threshold having a travel frequency of 40% or greater, activity table 240 may show results 516 after such a designation. As show in results 516, only sub-routes that have been traversed 40% or more of the time are listed (e.g., excludes sub-routes E-F', F'-G, A-B', and B'-I). The designated driving activity determination core 204 may then send the geolocation data and/or a corresponding auxiliary data associated with the one or more designated driving activities to the neighborhood map generation core 206. The neighborhood map generation core 206 may then generate a neighborhood map having representative driving activity 518 that includes the designated sub-routes that meet the predeterminable auxiliary threshold using the received geolocation data and/or a corresponding auxiliary data. As shown in results 518, only designated sub-routes A-B, B-C, C-D, D-E, E-F, F-G, G-H, and H-I, each of which have been traversed 4% or more of the time, appear. Neighborhood map generation core 206, via user neighborhood map generation application, may utilize edges of a reference map that match the geolocation data associated with designated driving activity 500 (as shown in results 516) to visually represent results 518. The neighborhood map generation core 206 may send the generated user neighborhood map to the on-board computer or mobile device 110 such that the on-board computer or mobile device 110 may present the generated user neighborhood map on its interactive user interface. Accordingly, by using the user interface, the user may visually be able to view most frequently traversed driving activity or activities, and optionally auxiliary data associated with each activity or activities of the user as well as of other drivers.

Figure 6A:
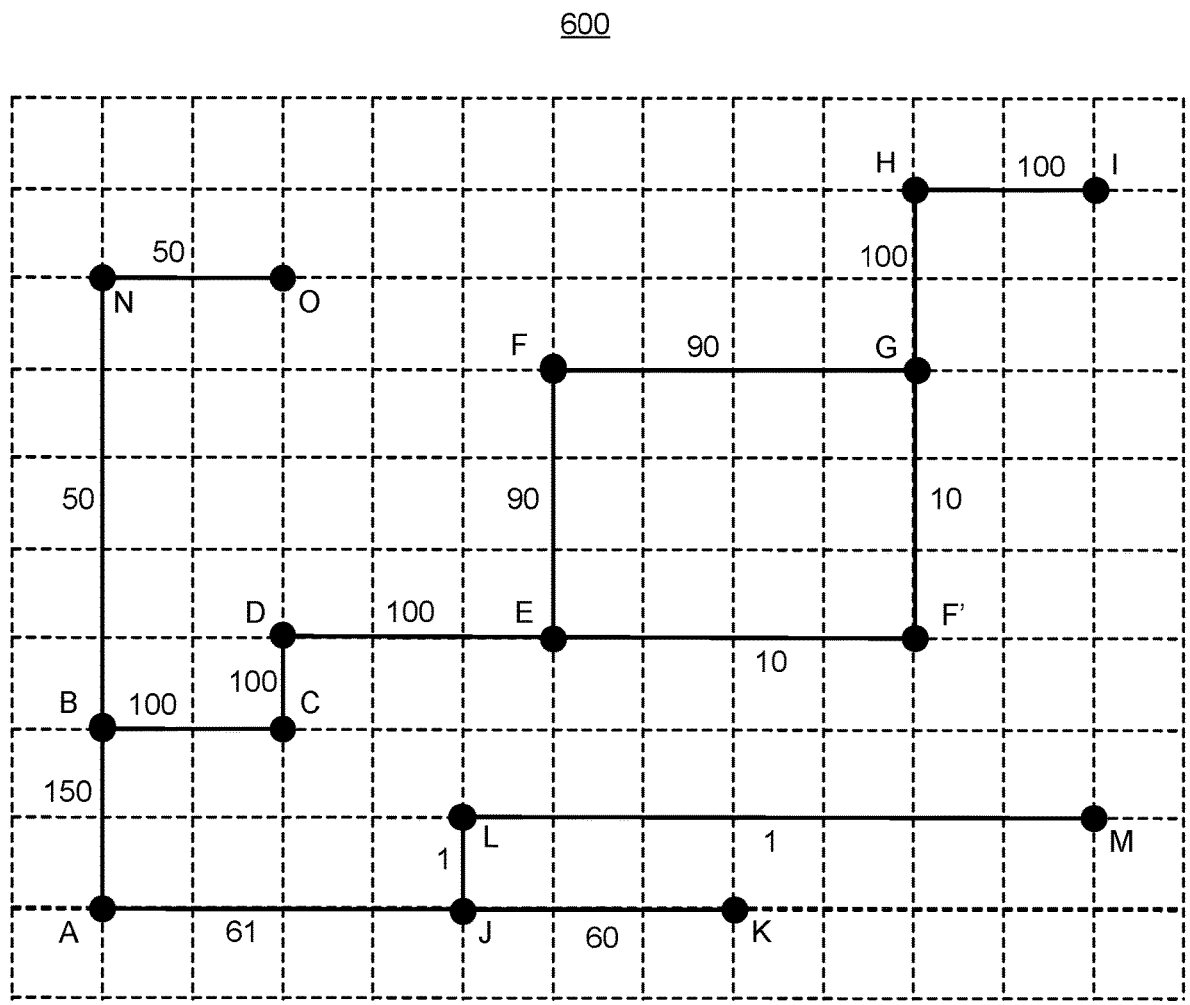
FIG. 6A illustrates exemplary geolocation data and corresponding auxiliary data associated with driving activities of a user according to some embodiments.

FIG. 6A is a diagram showing another example of geolocation data and corresponding auxiliary data associated with driving activities 600 of a user that has been detected by one or more sensors 106 of vehicle 108 in accordance with some embodiments. As shown, the GSP data may be consecutive and discrete geolocation data points (e.g., A, B, B' C, D, E, F, F', G, H, I, J, K, L, M, N, and O). Such geolocation data points may be latitude and longitude coordinates, addresses, street intersections, etc. The geolocation data points may make up several driving routes. For instance, Point A may be a starting discrete geolocation data point, point I may be an ending discrete geolocation data point, and points B, C, D, E, F, F', G, and H may be intermediate discrete geolocation data points between points A and I. Similarly, point A may be a starting discrete geolocation data point, point K may be an ending discrete geolocation data point, and point J may be an intermediate discrete geolocation data point between points A and K. Similarly, point A may be a starting discrete geolocation data point, point M may be an ending discrete geolocation data point, and points J and L may be intermediate discrete geolocation data points between points A and M. Similarly, point A may be a starting discrete geolocation data point, point O may be an ending discrete geolocation data point, and points B and N may be intermediate discrete geolocation data points between points A and O. Accordingly, FIG. 6A depicts several driving activities 600 (e.g., 5 driving routes) starting from point A and ending at different ending points (i.e., A-B-C-D-E-F-G-H-I, A-B-C-D-E-F'-G-H-I, A-J-K, A-J-L-M, and A-B-N-O), each driving route comprising several sub-routes (e.g., A-B, B-C, C-D, A-N, F'-G, A-J. D-G. etc.). FIG. 6A also depicts auxiliary data (e.g., travel frequency in units of the number of times traversed) for each sub-route for each driving route. For example, the driving activities 600 indicates that the user traversed sub-routes A-B, B-C, C-D, D-E, E-F, F-G, G-H, and H-I of route A-B-C-D-E-F-G-H-I a total of 150, 100, 100, 100, 90, 90, 100, and 100 times, respectively. Similarly, the driving activities 600 indicates that the user traversed sub-routes A-B, B-C, C-D, D-E, E-F', F'-G, G-H, and H-I of route A-B-C-D-E-F'-G-H-I a total of 150, 100, 100, 100, 10, 10, 100, and 100 times, respectively. Similarly, the driving activities 600 indicates that the user traversed sub-routes A-J and J-K of route A-J-K a total of 61 and 60 times, respectively. Similarly, the driving activities 600 indicates that the user traversed sub-routes A-J, J-L, and L-M of route A-J-L-M a total of 61, 1 and 1 times, respectively. Similarly, the driving activities 600 indicates that the user traversed sub-routes A-B, B-N, and N-O of route A-B-N-O a total of 150, 50, and 50 times, respectively. Although not pictured, other auxiliary data may correspond to each sub-route, such as a time stamp, speed, acceleration, braking, or a driving score.

Figure 6B:
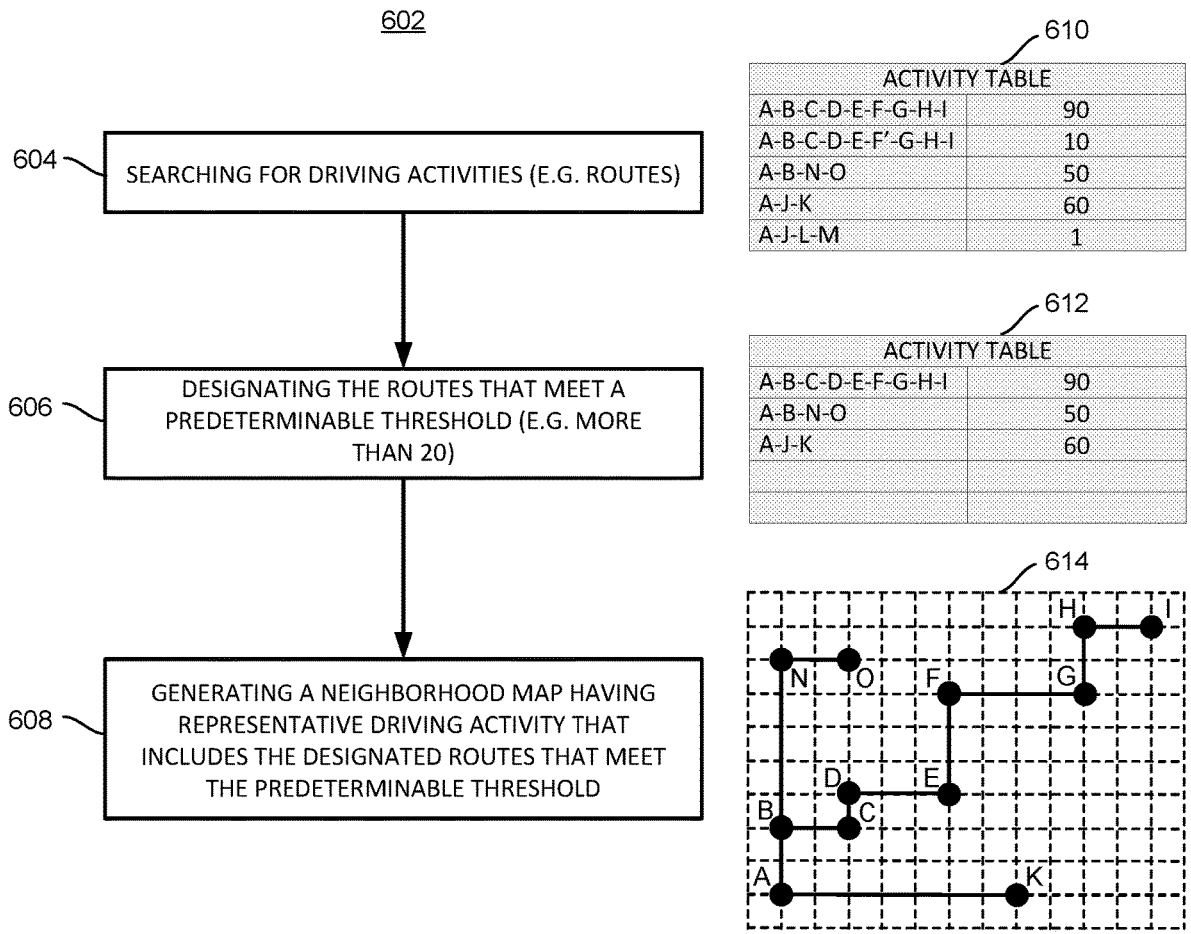
FIG. 6B illustrates an exemplary method for generating a neighborhood map showing the most frequently traversed driving activities for a user having driving activities as depicted in FIG. 6A in accordance with some embodiments.

FIG. 6B illustrates an example method 602 for generating a neighborhood map showing the most frequently traversed driving activities for a user having driving activities 600 as depicted in FIG. 6A in accordance with some embodiments. Method 602, carried out by the designated driving activity determination core 204 and the neighborhood map generation core 206 for example, may begin by searching for driving activities (e.g., routes), as shown in block 604. Such a search may be based on a certain criteria (e.g., routes having a sub-route that has been traversed at least a certain number of times, routes having a time stamp between a certain time period, etc.). For example, after designated driving activity determination core 204 executes designated driving activities application 236 to receive the set of geolocation data and/or a corresponding auxiliary data associated with driving activities 600 from geolocation and/or auxiliary data collection engine 202, the designated driving activity determination core 204 may, via execution of designated driving activities application 236, search the activity table 240 to identify a plurality of driving activities (e.g., routes) that have common geolocation data, such as starting and ending discrete geolocation data points. Activity table 240 may show results 610 after such a search, which includes routes A-B-C-D-E-F-G-H-I, A-B-C-D-E-F'-G-H-I, A-B-N-O, A-J-K, and A-J-L-M of driving activities 600. Such a search may indicate auxiliary data associated with the driving activities 600, such as the least number of times that a sub-route of a driving route has been traversed. For example, results 610 may indicate that route A-B-C-D-E-F-G-H-I has a least travelled sub-route of 90 times, route A-B-C-D-E-F'-G-H-I has a least travelled sub-route of 10 times, route A-B-N-O has a least travelled sub-route of 50 times, route A-J-K has a least travelled sub-route of 60 times, and route A-J-L-M has a least travelled sub-route of 1 time. Method 602 may proceed by generally determining, by the designated driving activity determination core 204, one or more designated driving activities that are representative (e.g., most frequently travelled) of the plurality of driving activities. Specifically, for this to occur, method 602 may proceed by designating the routes that meet a predeterminable auxiliary threshold (e.g., having a sub-route that has been traversed more than 20 times), as shown in block 606. For instance, if the designated driving activities application 236 is programmed to have an auxiliary threshold having a travel frequency of 20 or more times, activity table 240 may show results 612 after such a designation. As show in results 612, only routes having sub-routes that have been traversed 20 or more times are listed (e.g., excludes routes A-B-C-D-E-F'-G-H-I and A-J-L-M). The designated driving activity determination core 204 may then send the geolocation data and/or a corresponding auxiliary data associated with the one or more designated driving activities to the neighborhood map generation core 206. The neighborhood map generation core 206 may then generate a neighborhood map having representative driving activity 614 that includes the designated routes that meet the predeterminable auxiliary threshold using the received geolocation data and/or a corresponding auxiliary data. As shown in results 614, only designated routes A-B-C-D-E-F-G-H-I, A-B-N-O, and A-J-K, each of which have at least one sub-route that has been traversed 20 or more times, appear. Neighborhood map generation core 206, via user neighborhood map generation application, may utilize edges of a reference map that match the geolocation data associated with designated driving activity 600 (as shown in results 612) to visually represent results 614. The neighborhood map generation core 206 may send the generated user neighborhood map to the on-board computer or mobile device 110 such that the on-board computer or mobile device 110 may present the generated user neighborhood map on its interactive user interface. Accordingly, by using the example user interface as depicted in FIG. 7, the user may visually be able to view most frequently traversed driving activity or activities, and optionally auxiliary data associated with each activity or activities of the user as well as of other drivers.

Figure 7:
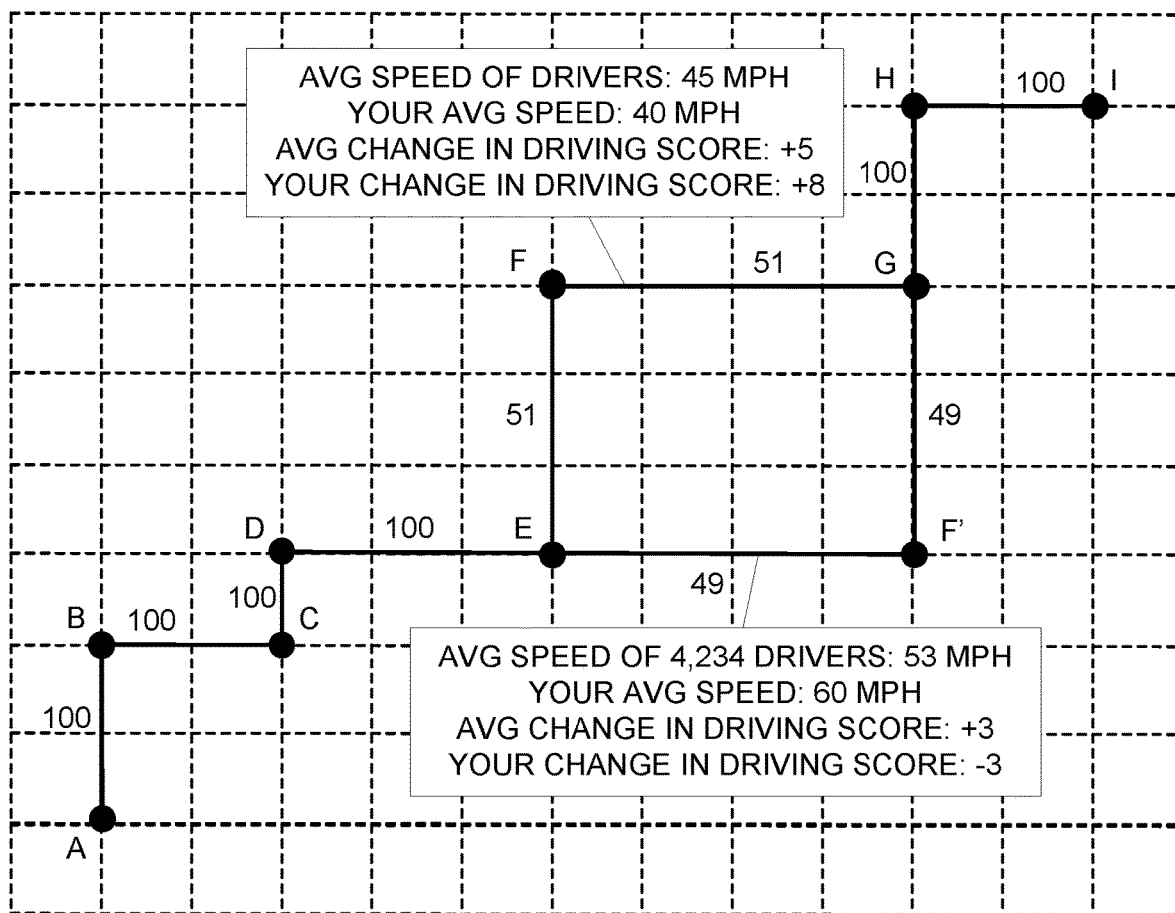
FIG. 7 illustrates an exemplary user interface according to some embodiments.

FIG. 7 shows a neighborhood map 700 having representative driving activity, such as designated routes A-B-C-D-E-F-G-H-I and A-B-C-D-E-F'-G-H-I in accordance with some embodiments. The neighborhood map may include auxiliary data for one or more sub-routes that make up the routes. The neighborhood map generation core 206 may receive geolocation data and/or a corresponding auxiliary data associated with the one or more designated driving activities from the designated driving activity determination core 202 to generate the neighborhood map 700. For example, FIG. 7 indicates auxiliary data (e.g., travel frequency in units of the number of times traversed, average speed of other drivers, average speed of the user, average change in driving score of other drivers, and average change in driving score of the user) for one or more sub-route for each driving route indicated on the neighborhood map 700. Although neighborhood map 700 indicates auxiliary data at the granularity level of a sub-route, it is contemplated that auxiliary data may be shown at other granularity levels, such as at the level of a route. A user that views the neighborhood map 700 may be informed that the user takes two alternative routes to travel between points A and I. As shown in FIG. 7, neighborhood map 700 indicates that the user has an average speed of 40 mph when travelling on sub-route F-G, whereas other drivers have an average speed of 45 mph when travelling on the same sub-route. The neighborhood map 700 may also indicate that the user improves his driving score by 8 points, whereas other drivers improve their driving score by 5 points. Similarly, neighborhood map 700 indicates that the user has an average speed of 60 mph when travelling on sub-route E-F', whereas other drivers have an average speed of 53 mph when travelling on the same sub-route. The neighborhood map 700 may also indicate that the user reduces his driving score by 3 points, whereas other drivers improve their driving score by 3 points. Accordingly, the user may be placed on notice to either drive more carefully on sub-route E-F' or to take route A-B-C-D-E-F-G-H-I as opposed to A-B-C-D-E-F'-G-H-I, for example.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz, variables inferred from the observed data points. In some embodiments, the methods and systems described herein may use machine learning techniques to identify and estimate the effects of observed or latent information such as time stamp, speed information, acceleration information, travel frequency information, braking information, and driving score information that influence the auxiliary data that may be included in the generated neighborhood map.

Some embodiments described herein may include automated machine learning to aggregate geolocation data and auxiliary data associated with a plurality of driving activities, identify the plurality of driving activities that have common geolocation data points based on a geolocation threshold, determine one or more designated driving activities based on an auxiliary threshold, generate a neighborhood map that includes the one or more designated driving activities, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element (e.g., on-board computer or mobile device 110) may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (e.g., geolocation data and auxiliary data associated with a plurality of driving activities), in order to facilitate making predictions. Models may be created based upon example inputs of data in order to make valid and reliable predictions for novel inputs.

Additionally or alternatively, the machine learning programs may be trained by inputting sample data sets or certain data into the programs, such as user inputs and geolocation data and/or auxiliary data from mobile device-mounted sensors, vehicle-mounted sensors, smart infrastructure-mounted sensors, and wearable electronics-mounted sensors discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained to aggregate geolocation data and auxiliary data associated with a plurality of driving activities at certain times of the day, such as when the user is most likely to drive a vehicle having sensors that collect the aggregate geolocation data and auxiliary data.

After training, machine learning programs (or information generated by such machine learning programs) may be used to evaluate additional data. Such training data may be related to past and/or driving activity gathered by vehicles, mobile device, or smart infrastructure, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such new or additional data may be related to current, up-to-date, or real-time driving activity gathered by vehicles, mobile device, smart infrastructure, or other sensors and cameras, or other similar data to be analyzed or processed. Such trained machine learning programs may, thus, be used to perform part or all of the analytical functions of the methods described elsewhere herein.

All of the foregoing methods discussed herein may be include additional, less, or alternate actions, including those discussed elsewhere herein. All of the foregoing methods may be implemented via one or more local or remote processors, transceivers, servers, and/or sensors, and/or via computer-executable instructions stored on computer-readable medium or media. The foregoing devices and systems may also include additional, less, or alternate functionality, including that discussed elsewhere herein.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. Finally, unless a claim element is defined by reciting the word "means" and a function without the recital of any structure, it is not intended that the scope of any claim element be interpreted based upon the application of 35 U.S.C. § 112(f). The patent claims at the end of this patent application are not intended to be construed under 35 U.S.C. § 112(f) unless traditional means-plus-function language is expressly recited, such as "means for" or "step for" language being explicitly recited in the claim(s).

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for generating neighborhood maps, the method comprising:
   receiving, by a server, geolocation data and auxiliary data associated with a user's driving activities;
   aggregating, by the server, the geolocation data and the auxiliary data;
   identifying, by the server, based upon the aggregated geolocation data and auxiliary data, a plurality of driving routes;
   determining, by the server, from the identified plurality of driving routes and based upon a travel frequency threshold, one or more designated driving routes frequently traversed by the user;
   generating, by the server, a user neighborhood map that includes the one or more designated driving routes; and
   transmitting, by the server, the user neighborhood map to the user.

2. The computer-implemented method of claim 1, wherein the one or more designated driving routes include one of a single driving route or a plurality of sub-routes that comprise a single driving route.

3. The computer-implemented method of claim 1, wherein generating the user neighborhood map includes utilizing one or more edges of a reference map that match the geolocation data associated with the one or more designated driving routes.

4. The computer-implemented method of claim 3, wherein generating the user neighborhood map further includes populating the user neighborhood map with one of the auxiliary data associated with the one or more designated driving routes that is pertinent to the user.

5. The computer-implemented method of claim 3, wherein generating the user neighborhood map further includes populating the user neighborhood map with one of the auxiliary data associated with the one or more designated driving routes that is pertinent to a driver different from the user.

6. The computer-implemented method of claim 1, wherein identifying the plurality of driving routes includes searching an activity table storing the aggregated geolocation data and the auxiliary data to identify the plurality of driving routes from the user's driving activities that have common geolocation data points.

7. The method of claim 1, wherein generating the user neighborhood map further includes:
   populating the user neighborhood map with one or more of the auxiliary data associated with the one or more designated driving routes that is pertinent to the user; and
   populating the user neighborhood map with one or more of the auxiliary data associated with the one or more designated driving routes that is pertinent to a driver different from the user.

8. The method of claim 7, wherein the auxiliary data includes one or more of average speed or a driving score for the designated driving routes.

9. The method of claim 1, further comprising:
   identifying, by the server, based upon the aggregated geolocation data and auxiliary data, one or more driving activities;
   determining, by the server, from the identified one or more driving activities and based upon an auxiliary threshold, one or more designated driving activities; and
   populating the user neighborhood map with the one or more designated driving activities.

10. A server for generating neighborhood maps, the server comprising:
    a processor; and
    a memory storing instructions that, when executed by the processor, cause the processor to:
      receive geolocation data and auxiliary data associated with a user's driving activities;
      aggregate the geolocation data and the auxiliary data;
      identify, based upon the aggregated geolocation data and auxiliary data, a plurality of driving routes;
      determine, from the identified plurality of driving routes and based upon a travel frequency threshold, one or more designated driving routes frequently traversed by the user;
      generate a user neighborhood map that includes the one or more designated driving routes; and
      transmit the user neighborhood map to the user.

11. The server of claim 10, wherein the one or more designated driving routes include one of a single driving route or a plurality of sub-routes that comprise a single driving route.

12. The server of claim 10, wherein the instructions, when executed by the processor, that cause the processor to generate the user neighborhood map further include instructions that cause the processor to generate the user neighborhood map by utilizing one or more edges of a reference map that match the geolocation data associated with the one or more designated driving routes.

13. The server of claim 12, wherein the instructions, when executed by the processor, that cause the processor to generate the user neighborhood map further include instructions that cause the processor to populate the user neighborhood map with one of the auxiliary data associated with the one or more designated driving routes that is pertinent to the user.

14. The server of claim 12, wherein the instructions, when executed by the processor, that cause the processor to generate the user neighborhood map further include instructions that cause the processor to populate the user neighborhood map with one of the auxiliary data associated with the one or more designated driving routes that is pertinent to a driver different from the user.

15. The server of claim 10, wherein the instructions, when executed by the processor, that cause the processor to identify the plurality of driving routes further include instructions that cause the processor to search an activity table storing the aggregated geolocation data and the auxiliary data to identify the plurality of driving routes from the user's driving activities that have common geolocation data points.

16. The server of claim 10, wherein the instructions further include instructions that cause the processor to:
  populate the user neighborhood map with one or more of the auxiliary data associated with the one or more designated driving routes that is pertinent to the user; and
  populate the user neighborhood map with one or more of the auxiliary data associated with the one or more designated driving routes that is pertinent to a driver different from the user.

17. The server of claim 16, wherein the auxiliary data includes one or more of average speed or a driving score for the designated driving routes.

18. The server of claim 10, wherein the instructions further include instructions that cause the processor to:
  identify, based upon the aggregated geolocation data and auxiliary data, one or more driving activities;
  determine, from the identified one or more driving activities and based upon an auxiliary threshold, one or more designated driving activities; and
  populate the user neighborhood map with the one or more designated driving activities.

19. A non-transitory computer readable medium storing instructions for generating neighborhood maps, the instructions when executed by a processor of a computing device cause the computing device to:
  receive geolocation data and auxiliary data associated with a user's driving activities;
  aggregate the geolocation data and the auxiliary data;
  identify, based upon the aggregated geolocation data and auxiliary data, a plurality of driving routes;
  determine, from the identified plurality of driving routes and based upon a travel frequency threshold, one or more designated driving routes frequently traversed by the user;
  generate a user neighborhood map that includes the one or more designated driving routes; and
  transmit the user neighborhood map to the user.

20. The non-transitory computer readable medium of claim 19, wherein the one or more designated driving routes include one of a single driving route or a plurality of sub-routes that comprise a single driving route.

21. The non-transitory computer readable medium of claim 19, wherein the instructions when executed by the processor that cause the computing device to generate the user neighborhood map further cause the computing device to generate the user neighborhood map by utilizing one or more edges of a reference map that match the geolocation data associated with the one or more designated driving routes.

22. The non-transitory computer readable medium of claim 21, wherein the instructions when executed by the processor that cause the computing device to generate the user neighborhood map further cause the computing device to populate the user neighborhood map with one of the auxiliary data associated with the one or more designated driving routes that is pertinent to the user.

23. The non-transitory computer readable medium of claim 21, wherein the instructions when executed by the processor that cause the computing device to generate the user neighborhood map further cause the computing device to populate the user neighborhood map with one of the auxiliary data associated with the one or more designated driving routes that is pertinent to a driver different from the user.

24. The non-transitory computer readable medium of claim 19, wherein the instructions when executed by the processor that cause the computing device to identify the plurality of driving routes further cause the computing device to search an activity table storing the aggregated geolocation data and the auxiliary data to identify the plurality of driving routes from the user's driving activities that have common geolocation data points.

25. The non-transitory computer readable medium of claim 19, wherein the instructions further include instructions that cause the computing device to:
  populate the user neighborhood map with one or more of the auxiliary data associated with the one or more designated driving routes that is pertinent to the user; and
  populate the user neighborhood map with one or more of the auxiliary data associated with the one or more designated driving routes that is pertinent to a driver different from the user.

26. The non-transitory computer readable medium of claim 25, wherein the auxiliary data includes one or more of average speed or a driving score for the designated driving routes.

27. The non-transitory computer readable medium of claim 19, wherein the instructions further include instructions that cause the computing device to:
  identify, based upon the aggregated geolocation data and auxiliary data, one or more driving activities;
  determine, from the identified one or more driving activities and based upon an auxiliary threshold, one or more designated driving activities; and
  populate the user neighborhood map with the one or more designated driving activities.

* * * * *